UNITED STATES PATENT OFFICE.

HENRY AKERMAN DESMOND COLLINS, OF ABERMELLTE, ENGLAND.

MANUFACTURE OF REFRACTORY MATERIAL.

No. 826,763.      Specification of Letters Patent.      Patented July 24, 1906.

Application filed July 20, 1903. Serial No. 166,405.

*To all whom it may concern:*

Be it known that I, HENRY AKERMAN DESMOND COLLINS, a subject of the King of Great Britain, residing at Abermellte, Glynneath, South Wales, England, have invented a new and useful Manufacture of a Refractory Material; and I do hereby declare that the following is a full, clear, and exact description of the invention, which will enable others skilled in the art to which it appertains to make and use the same.

This invention relates to the manufacture of bricks or blocks for use in lining steel furnaces and in like structures where an intense heat is to be withstood, and the composition may also be used for the production of retorts, crucibles, &c.

Bricks which are now used for the purposes for which the improved bricks are intended, such as for lining steel furnaces, are now made by mixing lime and silica and are fired at a high temperature; but these bricks have to be made by hand and dried before they can be fired.

I have discovered that by using sodium silicate of high density (which is not soluble at ordinary temperatures) and a calcium compound a plastic mass is produced which can be molded in an ordinary press-brick machine and removed directly to the kiln for firing, thereby greatly reducing the cost of manufacture and producing an article which is less friable than the bricks heretofore manufactured. The material may also be molded into other articles for use where a material capable of resisting high temperatures is desired.

According to the invention the refractory material is made by taking pulverized silica or silicious matter mixed with one or more compounds of calcium and sodium and sodium silicate of high density, which is not soluble in water at ordinary temperatures. The material is molded into the desired form and transferred at once without preliminary drying to a kiln and fired.

I have found that good results are obtained from the following ingredients, mixed in about the proportions given: pulverized quartz, flint, or sea-sand, ninety-three parts, by weight; sodium silicate, (of, say, 140° Twaddell,) five parts, by weight; calcium chlorid, two parts, by weight. The materials are mixed together, molded into the desired shape and burned (without being dried) at a high temperature of, say, 2,500° to 4,000° Fahrenheit.

I wish it to be understood that the above ingredients and proportions are given by way of example and that they may be varied.

What I claim, and desire to secure by Letters Patent, is—

1. The process of manufacturing refractory articles, which consists in mixing pulverized silicious material with other materials including sodium silicate of high density, insoluble in water at ordinary temperatures, and a calcium compound, molding the material and firing it at high temperature, whereby the preliminary drying of the molded articles is rendered unnecessary, substantially as described.

2. The process of manufacturing refractory articles, which consists in mixing silicious material with sodium silicate of high density insoluble in water at ordinary temperatures, and calcium chlorid, molding the material and firing it at high temperature, whereby the preliminary drying of the molded articles is rendered unnecessary, substantially as described.

3. The process of manufacturing refractory articles, which consists in mixing silicious material with sodium silicate of substantially 140° Twaddell and calcium chlorid, in substantially the proportions described, molding the material and firing the molded articles without preliminary drying at a temperature of from 2,500° to 4,000° Fahrenheit, substantially as described.

4. A refractory article containing silicious material and sodium silicate of high density, insoluble in water at ordinary temperatures, and a calcium compound molded and fired at high temperature, substantially as described.

HENRY AKERMAN DESMOND COLLINS.

Witnesses:
JOHN E. BOUSFIELD,
C. G. REDFERN.